United States Patent
Patil et al.

(10) Patent No.: US 6,642,328 B2
(45) Date of Patent: Nov. 4, 2003

(54) PROCESS FOR MAKING OLEFIN-CARBON MONOXIDE COPOLYMERS FROM SYNTHESIS GAS

(75) Inventors: Abhimanyu O. Patil, Westfield, NJ (US); Manika Varma-Nair, Warren, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 10/090,873

(22) Filed: Mar. 5, 2002

(65) Prior Publication Data

US 2002/0091213 A1 Jul. 11, 2002

Related U.S. Application Data

(62) Division of application No. 09/618,185, filed on Jul. 18, 2000, now abandoned.

(51) Int. Cl.$^7$ .................................................. C08F 4/04
(52) U.S. Cl. .................. 526/219.6; 526/227; 526/348.8
(58) Field of Search .............................. 526/219.6, 227, 526/348.8

(56) References Cited

FOREIGN PATENT DOCUMENTS

GB          1394590       *   8/1972

* cited by examiner

Primary Examiner—David W. Wu
Assistant Examiner—William K Cheung
(74) Attorney, Agent, or Firm—Paul E. Purwin; Joseph C. Wang

(57) ABSTRACT

The invention is related to non-linear olefin-carbon monoxide copolymer composition which is derived from an olefin feedstream and a synthesis gas feedstream. The invention is also related to a method for preparing olefin-carbon monoxide copolymers by heating an olefin feed and a synthesis gas feed in the presence of a free radical polymerization initiator. More particularly, the synthesis gas feed comprises predominantly carbon monoxide and hydrogen. The copolymers of the invention are useful as polyvinyl chloride plasticizers.

5 Claims, No Drawings

US 6,642,328 B2

PROCESS FOR MAKING OLEFIN-CARBON MONOXIDE COPOLYMERS FROM SYNTHESIS GAS

CROSS-REFERENCE TO RELATED APPLICATIONS

This application is a Divisional under 37C.F.R. §1.53(b) of U.S. Ser. No. 09/618,185 filed on Jul. 18, 2000 now abandoned.

FIELD OF THE INVENTION

The invention is directed towards olefin-carbon monoxide copolymers, wherein the carbon monoxide constituent is derived from synthesis gas. The invention also encompasses a method for producing the olefin-carbon monoxide copolymers using free radical polymerization.

BACKGROUND

Olefin-carbon monoxide ("olefin-CO") copolymers such as ethylene-carbon monoxide ("E—CO") copolymers are generally made from pure ethylene and carbon monoxide ("CO") feeds using either free radical initiators or organometallic catalysts. The olefin-CO copolymers formed from free radical polymerization are useful as PVC modifiers and degradable films. The organometallic catalyzed products are linear alternating polymers which are useful as engineering resins. Unfortunately, using pure feeds to produce these polymers increases the cost which can make production too costly. Also, the copolymers prepared according to either of these methods typically have low paraffin solubility.

Therefore, there is a need for providing a low cost method to produce olefin-CO copolymers. Additionally, copolymers having better solubility in paraffins is also desirable.

SUMMARY OF INVENTION

The instant invention provides olefin-CO copolymers which are derived from olefin feeds and synthesis gas feeds. Furthermore, the copolymers of the instant invention are non-linear and depending on the specific molecular weight and degree of branching may be paraffin soluble. These olefin-CO copolymers may be used as effective plasticizers in polyvinyl chloride compositions.

In one embodiment, the invention is a composition comprising a non-linear olefin-CO copolymer derived from an olefin feed and a synthesis gas feed.

In another embodiment, the invention is a polymerization method comprising reacting an olefin feed and a synthesis gas feed under free radical copolymerization conditions to form an olefin-carbon monoxide copolymer. In yet another embodiment, the invention is the product formed from this polymerization method.

These and other features, aspects and advantages of the present invention will become better understood with regard to the following description and appended claims.

DETAILED DESCRIPTION OF THE INVENTION

The invention relates to a composition comprising a copolymer of olefin and CO wherein the CO is derived from synthesis gas. It should be appreciated by those skilled in the art that the term "copolymer" is used herein according to its broad meaning of a macromolecule formed from two or more monomer sources. Similarly, the term "polymer" is used herein according to its broad meaning of a macromolecule formed from at least one monomer source. The term "synthesis gas" (a.k.a., "syngas") refers to a gas mixture comprising predominantly of CO and hydrogen in various proportions and may contain other components in lesser quantities.

More specifically, syngas can be made by many processes, the most common being partial oxidation and steam reforming. Feedstocks can vary from coal (in which case the partial oxidation process is often referred to as "gasification") to natural gas. Combinations of partial oxidation and steam reforming, for example autothermal reforming, are often used to optimize the cost of producing a syngas of specific composition. The specific composition of the syngas from these conversion technologies will be influenced by temperature, pressure, and concentrations of co-reactants, including steam and CO2. The watergas shift reaction is often used to adjust the H2/CO ratio of the syngas composition. Separation technologies are also used to adjust syngas composition, and syngas compositions can be varied in an infinite manner by the combination of these reaction and separation technologies. Lowest cost syngas is usually made by application of the fewest process steps, such that syngas ratios between H2/CO of 0.5 and 3 are usually most economical to produce. These processes and combinations, as well as the major components that are present in the resulting syngas, are well known in the art. In the present invention, the ratio of H2/CO is between 10:90 and 90:10. More preferably, the ratio of H2/CO is between 25:75 and 75:25. Most preferably, the ratio of H2/CO is between 40:60 and 60:40.

In one embodiment, the invention is a composition comprising a non-linear olefin-CO copolymer derived from an olefin feed and a synthesis gas feed.

The olefins (i.e., olefinically unsaturated compounds) useful in the invention typically contain up to about 20 carbon atoms and preferably up to 10 carbon atoms. They may contain heteroatoms; however, it is preferred that the olefinically unsaturated compounds are hydrocarbons. A preferred class of olefinically unsaturated hydrocarbons are aliphatic mono-olefins, in particular α-olefins of which ethylene is particularly preferred.

The polymers of the invention are non-linear polymers having a total number of branches per 1000 carbon atoms ranging from about 20 to about 300. Because the instant invention employs free-radical polymerization to form its non-linear copolymers, the resulting non-linear copolymers may also be characterized as being non-alternating. Generally speaking, the branches of the polymers (also referred to as "branchiness") are measured by $^{13}C$ solution NMR in deutero chloroform using a $Cr(AcAc)_3$ relaxation agent. The number of $C_1$ branches per 1000 carbon atoms are measured at about 20.1 ppm; the number of $C_2$ branches per 1000 carbon atoms are measured at about 11.3 ppm; the number of $C_3$ are measured at about 14.7 ppm; and the number of $C_4$ branches are measured at about 14.2 ppm.

The number average molecular weight ("Mn") of the copolymers formed in accordance with the invention can range from about 100 to about 1,000,000 with a preferred range from about 200 to 30,000. The degree of branchiness of the copolymer chains and the number of monomer units originating in the monomers with polymerizable carbon—carbon unsaturation relative to the number of carbon atoms originating in carbon monoxide will both, at least in part, determine the regularity of the polymer chains and thereby also some of the properties of the copolymer, for example the crystallinity and solubility. The polymers prepared in accord with this invention include paraffin-soluble as well as paraffin insoluble species. The term "paraffin" as used herein is a normal, iso, or straight chain alkane.

The ratio of the number of monomer units originating in the olefinically unsaturated compound to the number of carbon atoms originating in carbon monoxide is preferably at most about 99:1 and more preferably in the range of from about 90:1 to about 1:1, and still more preferably from about 95:1 to about 1:1.

In another embodiment, the invention provides a polymerization method for reacting an olefin feed and a synthesis gas feed under free radical copolymerization conditions to produce the olefin-CO copolymer composition described above. The free radical polymerization process uses organic peroxides as a free radical initiator according to conventional methods well known to those skilled in the art. Representative initiators include, but are not limited to, dialkyl peroxides such as ditertiary-butyl peroxide, 2,5-dimethyl-2,5-ditertiary-butyl-peroxyhexane, di-cumyl peroxide; alkyl peroxides such as tertiary-butyl hydroperoxide, tertiary-octyl hydroperoxide, cumene hydroperoxide; aroyl peroxides such as benzoyl peroxide; peroxy esters such as tertiary-butyl peroxypivalate, tertiary-butyl-perbenzoate; and compounds such as azo-bis-isobutyronitrile. Free radical initiators with an appropriate half life at reaction temperatures ranging from about 50° C. to about 230° C. can be used. Of these, t-butyl peroxypivalate, which has a half life of about 10 hours at 66° C., is preferred.

Typically copolymerization will occur at temperatures ranging from about 50 to about 230° C. and preferably from about 50° C. to about 200° C. Pressures can range from about 100 to about 30,000 psig and preferably from about 100 psig to about 3,000 psig. Of course, the copolymerization is accomplished in the presence of a free radical initiator having an appropriate half life.

Preferably, the reaction occurs in the presence of a solvent. Suitable solvents include toluene, benzene, dioxane, pentane, heptane, hexane, propylene oxide, cyclohexane, supercritical carbon dioxide, and the like. Hexane is preferred.

The copolymers prepared in accord with this invention may be recovered using conventional methods. For example, filtration or evaporation of the diluent may be used. Further, the copolymers may be brought into the desired shape using standard forming techniques, such as cold or hot pressing. Alternatively, the polymerization is carried out in such a way that the copolymer is formed in the desired shape, such as by solution polymerization in a thin layer and subsequent removal of the diluent, which yields the copolymer in the form of a film.

The invention is further described in the following non-limiting examples.

EXAMPLES

Example 1
The Synthesis of Ethylene-CO Copolymers Using Ethylene and Syngas

A 300-mL autoclave engineer's reactor was charged with 150 mL pure n-hexane and 0.64 g of a 75% solution of t-butyl peroxypivalate in mineral spirits. The reactor was sealed and purged with purified nitrogen. The reactor was then pressurized with an ethylene and syngas mixture (ethylene:carbon monoxide:hydrogen 50:25:25, respectively). The temperature was raised to 66° C. while stirring, and the pressure was maintained for 24 hours. The reactor was allowed to cool to room temperature and then depressurized. The hexane was removed on a rotary evaporator, leaving 7.8 g of product.

The IR spectrum of the product shows a very strong peak at 1705 $cm^{-1}$ due to the carbonyl group. Thus, CO has been incorporated in the product. The NMR of the product suggests that the polymer has 39.5% CO incorporation. The GPC of the product indicates a Mn of 1100 and Mw of 2300 (polystyrene standards, THF solvent).

Example 2
Synthesis of Ethylene-CO Copolymers Using Ethylene and Syngas

A 300-mL autoclave engineer's reactor was charged with 150 mL pure n-hexane and 0.64 g of a 75% solution of t-butyl peroxypivalate in mineral spirits. The reactor was sealed and purged with purified nitrogen. The reactor was then pressurized with an ethylene and syngas mixture (ethylene:carbon monoxide:hydrogen 70:15:15, respectively). The temperature was raised to 66° C. while stirring, and the pressure was maintained for 24 hours. The reactor was allowed to cool to room temperature and then depressurized. The hexane was removed on a rotary evaporator leaving 9.3 g of product.

The IR spectrum of the product shows a very strong peak at 1709 $cm^{-1}$ due to the carbonyl group. Thus, CO has been incorporated in the product. The NMR of the product suggests that the polymer has 33.9% CO incorporation. The GPC of the product indicates a Mn of 1600 and Mw of 3200 (polystyrene standards, THF solvent).

Example 3
Synthesis of Ethylene-CO Copolymers Using Ethylene and Syngas

A 300-mL autoclave engineer's reactor was charged with 150 mL pure n-hexane and 0.64 g of t-butyl peroxide in mineral spirits. The reactor was sealed and purged with purified nitrogen. The reactor was then pressurized with an ethylene and syngas mixture (ethylene:carbon monoxide:hydrogen 70:15:15, respectively). The temperature was raised to 120° C. while stirring, and the pressure was maintained for 24 hours. The reactor was allowed to cool to room temperature and then depressurized. The hexane was removed on a rotary evaporator leaving 4.3 g of product.

The IR spectrum of the product shows a very strong peak at 1711 cm−1 due to the carbonyl group. Thus, CO has been incorporated in the product. The NMR of the product suggests that polymer had 19.3% CO incorporation. The GPC of the product indicates a Mn of 590 and Mw of 1100 (polystyrene standards, THF solvent).

The above examples clearly show that olefin-CO copolymers can be formed using a syngas feed.

What is claimed is:

1. A copolymerization method comprising reacting an olefin feed and a synthesis gas feed under free radical copolymerization conditions to form an olefin-carbon monoxide copolymer.

2. The method of claim 1 wherein the copolymerization conditions range in temperature from about 50 to about 230° C. and range in pressure from about 100 to about 30,000 psig.

3. The method of claim 1 wherein the copolymerization is conducted in the presence of a solvent selected from the group consisting of toluene, benzene, dioxane, pentane, heptane, hexane, propylene oxide, cyclohexane, supercritical carbon dioxide, and mixtures thereof.

4. The method of claim 1 wherein the method employs a free radical initiator selected from the group consisting of ditertiary-butyl peroxide, 2,5dimethyl-2,5-ditertiary-butyl-peroxyhexane, di-cumyl peroxide, tertiary-butyl hydroperoxide, tertiary-octyl hydroperoxide, cumene hydroperoxide, benzoyl peroxide, tertiary-butyl peroxypivalate, tertiary-butyl-perbenzoate, azo-bis-isobutyronitrile and mixtures thereof.

5. The method of claim 1 wherein said olefin feed is ethylene.

* * * * *